July 3, 1962     T. C. GRIFFITHS     3,041,882

DRIVER INDICATOR DEVICE

Filed Jan. 19, 1960

INVENTOR
THEODORE C. GRIFFITHS

BY *Fisher Christen & Goodson*

ATTORNEYS 3,041,882
DRIVER INDICATOR DEVICE
Theodore C. Griffiths, 295 Hallock, Jamestown, N.Y.
Filed Jan. 19, 1960, Ser. No. 3,341
2 Claims. (Cl. 73—492)

This invention relates to a safety device and in particular to a device which will give a continuous and composite indication of the driving habits of a vehicle operator.

It is an objective of this invention to provide an inexpensive and uncomplicated apparatus which will indicate and record the extent to which a vehicle has been subjected to unusual movements, such as sudden stopping, unusual rapid acceleration, fast lateral changes of position, and unusual tilts.

The vast majority of vehicle operators are completely unsupervised while operating their vehicles. Prior to this invention, there were no satisfactory means by which a person in a supervisory position could determine the overall driving efficiency of an operator under his control except by actually being in the vehicle, or relying on reports of accidents and tickets for traffic violations and the like. The difficulties of these means are apparent without further discussion here. In fact, it is oftentimes desired by the operator himself to judge and appraise his own driving skills and habits with a recognized standard of safety. It is, therefore, an important objective of this invention to provide a device which is readily attached to a vehicle by which the operator himself, or his supervisor, may determine the amount of unusual and undesirable maneuvers to which the vehicle has been subjected without a supervisor being present during vehicle operation.

The invention described herein will keep an accurate and composite record of faulty vehicle practices, especially those practices of drivers who depend on an unwarranted use of brakes, change position in highway lanes continuously, drive too fast in traffic, fail to reduce speed on turns, or depend on rapid acceleration to get themselves out of dangerous traffic conditions, and other practices which show a lack of anticipating danger by the operator.

The invention may be used by a driver himself to determine his own driving skill and habits. The only means a driver has of judging his skills at the present time are completely subjective and are unsatisfactory for that reason.

A further objective of this invention is to provide a device to measure the degree of advancement and responsibility which driver trainees have reached.

Other objectives and advantages will be apparent from the following description, wherein reference is made to the accompanying drawings illustrating this embodiment of the invention.

Figure 1:
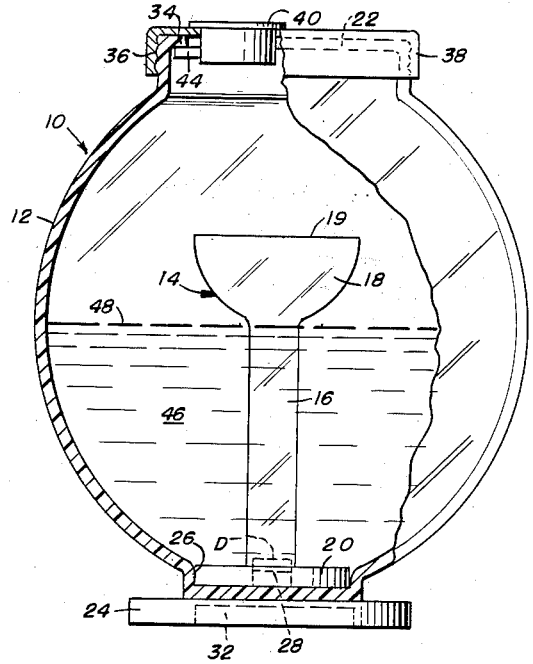
FIG. 1 is an elevational view of the invention with portions of the outside container broken away.
Figure 2:
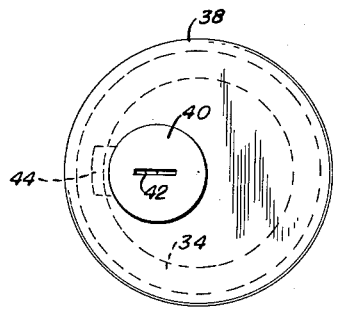
FIG. 2 is a plan view of the cap section of FIG. 1.

Referring now to the drawings where like elements indicate like parts, the numeral 10 indicates the assembly of one embodiment of this invention. The assembly is comprised basically of an outer container 12 of a plastic material, and an inner graduated container 14. The inner container is formed of a graduated stem section 16 having graduations 16', an upper cup section 18 and is enclosed at its bottom end by a base section 20. The upper cup or flared section 18 defines an opening 19. The outer container may be transparent or opaque, depending on the purpose for which it is used, and the inner container is normally transparent.

The outer container 12 has a ball-shaped configuration having an upper open end 22 and a base section 24. The base section may be formed integral with the container 12, or separately manufactured and permanently bonded thereto.

A recess 26 is formed in the bottom of container 12 to receive the base section 20 of container 14. Embedded within the base 20 is a permanent magnet 28, and embedded in base 24 is a permanent magnet 32. When container 14 is placed within recess 26 the magnets will firmly hold the two containers in their proper relationship with each other. The magnet 32 may preferably have sufficient strength to enable it to firmly attach the assembly 10 to a metallic portion of a vehicle. However, it is to be understood that the particular means by which the assembly is mounted on the vehicle may be varied to meet the circumstances required.

The opening 22 has a diameter sufficient to permit container 14 to be removed from container 12. In the event an opaque outer container is used, the inner container may then be removed for inspection. The opening 22 is formed with an interior peripheral flange 34 and is exteriorly threaded as shown at 36. An interiorly threaded cap 38 is adapted to close and seal the opening 22. Any sealing-type cover suitable for the purpose may be used.

As indicated by the numeral 40, the cap may be manufactured with a simple locking device. The particular locking device 40 is key operated through slot 42 to operate a simple locking lug 44 to cooperate with flange 34. Any tamper-proof lock which permits sealing of the container may be used for this purpose.

The apparatus is made operable by placing the container 14 in the position shown in FIG. 1 and partially filling the container 12 with any suitable liquid 46 to a prescribed level below opening 19. The device is then secured to a vehicle in an upright position; that is to say, having the liquid level line 48 approximately perpendicularly aligned to the longitudinal axis of stem 16. The cap 38 is then securely fastened to opening 22.

It can be seen, by inspection, that any sudden acceleration, deceleration, stopping, sudden direction changes or any excessive brake action will cause portions of liquid 46 to find its way by splash action, into the container 14. During a certain set amount of driving, a driver with poor habits and skills will show an excessive accumulation of liquid in container 14; whereas very little, if any, liquid will find its way to container 14 through the smooth action of a driver who anticipates trouble prior to the time it is upon him, and otherwise cautiously drives the vehicle. A referral to graduated stem 16 will disclose the composite results of the operator's driving habits.

The sensitivity of the device, of course, can be adjusted by changing the diameter of cup 18, the proximity of the edge 19 to the container wall 12, or by changing the level or viscosity of liquid 46. Another practical way of varying the sensitivity of the device has been to increase the depth of recess 26 and interiorly thread the recess to receive a mating thread exteriorly formed on base 20, whereby the relationship between edge 19 and the outer container 12 may be easily varied.

Figure 3:
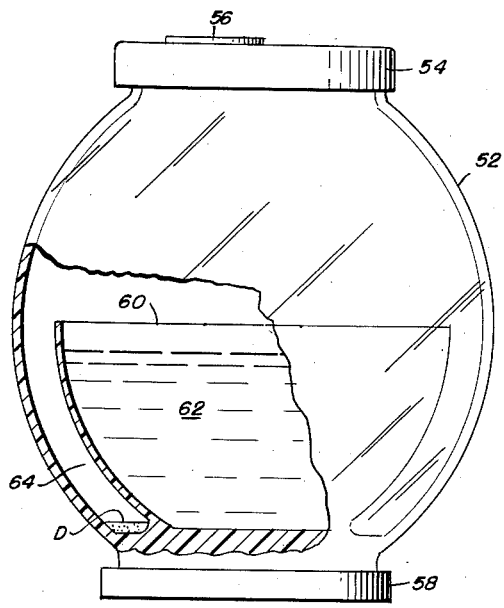
FIG. 3 is an elevational view, partly in section, of an alternate form of the invention.

FIG. 3 teaches another structure by which objectives of this invention may be accomplished. In this embodiment the outer container 52, the cap 54, lock 56 and base 58 remain substantially the same. However, the interior container 60 is adapted to contain the operating liquid 62. The interior container is formed integral with the outer container and has side walls spaced closely to the container 52, forming an annular container 64 to receive the liquid 62. In the event of a sharp inertia change being transmitted to this latter described embodiment, the liquid will go from the inner to the outer container. This latter embodiment adapts itself to graduating the outer container as at 52', and the liquid in the annular space can be observed without obstruction.

Each of the containers 14 and 64 may contain a dye substance D, whereby an amount of liquid which has spilled into these containers may be readily determined by visual inspection.

In summary, the device described will contribute to the driving safety of the motoring public by giving a composite and accumulative indication of driving skills. This contribution has been accomplished through a design of extremely simple and accurate determinations. The invention will indicate a variance from good driving techniques. It is true that even the finest drivers become involved in situations which require unusual impacts and other inertia changes to be given to their vehicles, but the composite and accumulative nature of the indication given by the invention will substantially unerringly indicate the amount of variance from safe practices.

In a general manner, while there has been disclosed in the above description, what is deemed to be the most practical and efficient embodiments of the invention, it should be well understood that the invention is not limited to such embodiments as there might be changes made in the arrangement, disposition and form of the parts without departing from the principle of the present invention as comprehended within the scope of the accompanying claims.

I claim:
1. An apparatus to give a composite indication of the driving skills and care of a vehicle operator comprising in combination, a sealed container having a normally upright position with respect to a driven vehicle, a second container within said sealed container having an upper open end in communication with the interior of said sealed container, a liquid in one of said containers, said liquid remaining therein during normal driving vibrations while said sealed container is in said upright position and no sharp inertia changes are transmitted to said liquid, and means facilitating selected portions of said liquid to transfer from said container having the liquid therein to said other container when said liquid receives sudden independent inertia changes caused by an irregular motion in said vehicle, said portions being proportioned to the extent of said inertia changes, and second means for indicating the composite amount of liquid received by said other container.

2. An apparatus to give a composite indication of the driving skills and care of a vehicle operator comprising in combination, a sealed container having a normally upright position with respect to a driven vehicle, a second elongated slender container within said sealed container having an upper open end in communication with the interior of said sealed container, a liquid in said sealed container, said liquid remaining therein during normal driving vibrations while said sealed container is in said upright position and no sharp inertia changes are transmitted to said liquid, and means facilitating selected portions of said liquid to transfer from said sealed container to said second container when said liquid receives sudden independent inertia changes caused by an irregular motion in said vehicle, said portions being proportioned to the extent of said inertia changes, and second means for indicating the composite amount of liquid received by said second container.

References Cited in the file of this patent
UNITED STATES PATENTS

| | | |
|---|---|---|
| 1,858,191 | Hadley et al. | May 10, 1932 |
| 1,975,824 | Blackwood | Oct. 9, 1934 |
| 2,166,410 | Jackson | July 18, 1939 |
| 2,192,797 | Muter | Mar. 5, 1940 |

FOREIGN PATENTS

| | | |
|---|---|---|
| 310,496 | Great Britain | Aug. 15, 1929 |